(12) United States Patent
Jensen et al.

(10) Patent No.: US 8,918,762 B2
(45) Date of Patent: Dec. 23, 2014

(54) GENERATING TEST PLANS AND TEST CASES FROM SERVICE-ORIENTED ARCHITECTURE AND PROCESS MODELS

(71) Applicant: International Business Machines Corporation, Armonk, NY (US)

(72) Inventors: Claus T. Jensen, Pawling, NY (US); Tapas K. Som, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/667,104

(22) Filed: Nov. 2, 2012

(65) Prior Publication Data
US 2014/0130014 A1    May 8, 2014

(51) Int. Cl.
*G06F 9/44* (2006.01)
(52) U.S. Cl.
USPC .......................................................... 717/124
(58) Field of Classification Search
None
See application file for complete search history.

(56) References Cited

U.S. PATENT DOCUMENTS

| 7,703,071 | B2 |   | 4/2010  | Kuester et al. |
|-----------|-----|---|---------|----------------|
| 8,423,962 | B2 | * | 4/2013  | Becker et al. ................. 717/124 |
| 2003/0188239 | A1 | * | 10/2003 | Hosokawa et al. ........... 714/724 |
| 2006/0190771 | A1 | * | 8/2006  | Hefner ............................ 714/38 |
| 2008/0282219 | A1 | * | 11/2008 | Seetharaman et al. ........ 717/101 |
| 2009/0006147 | A1 | * | 1/2009  | Padmanabhan ................... 705/7 |
| 2009/0183143 | A1 |   | 7/2009  | Li et al. |
| 2010/0153906 | A1 |   | 6/2010  | Dan et al. |
| 2011/0099050 | A1 |   | 4/2011  | Coldicott et al. |
| 2013/0311977 | A1 | * | 11/2013 | Nieminen et al. ............ 717/135 |

* cited by examiner

*Primary Examiner* — Philip Wang
(74) *Attorney, Agent, or Firm* — Cuenot, Forsythe & Kim, LLC

(57) ABSTRACT

Testing a system under test (SUT) having a service-oriented architecture includes generating a first test plan for an inbound interface for each service model, generating a second test plan for an outbound interface of each service model, and generating a third test plan for information consumed by the service models using a processor. Testing the system further includes generating a fourth test plan for a process model, wherein the process model utilizes the service models, generating a fifth test plan that maps service models and the process model to executables of the system, and concatenating the first, second, third, fourth, and fifth test plans into a complete test plan for the SUT using the processor.

20 Claims, 3 Drawing Sheets

GENERATING TEST PLANS AND TEST CASES FROM SERVICE-ORIENTED ARCHITECTURE AND PROCESS MODELS

BACKGROUND

Within a computer-based system, a Service-Oriented Architecture refers to a business-centric architectural approach to system design that is based upon service-oriented principles. An SOA, in general, relies upon one or more processes that link together a variety of services. Each service performs a repeatable business task.

Within computer-based systems, each architectural style is typically characterized by its organizing principles. In some cases, these principles determine how testing activities are planned and executed. In a non-SOA type of system, the organizing principle for testing activities is the set of requirements for a given solution to be achieved. For a non-SOA type of system, the requirements do not map cleanly to particular components of the solution, cannot be easily organized in hierarchies, and do not involve pre- and post-conditions for cross domain invocations. As such, applying testing principles for non-SOA type systems to SOA-type systems often results in inefficient and redundant testing.

BRIEF SUMMARY

A method of testing a system under test (SUT) having a service-oriented architecture includes generating a first test plan for an inbound interface for each service model, generating a second test plan for an outbound interface of each service model, generating a third test plan for information consumed by the service models using a processor, generating a fourth test plan for a process model, wherein the process model utilizes the service models, and generating a fifth test plan that maps service models and the process model to executables of the system. The method further includes concatenating the first, second, third, fourth, and fifth test plans into a complete test plan for the SUT using the processor.

A system for testing an SUT having a service-oriented architecture includes a processor configured to initiate executable operations. The executable operations include generating a first test plan for an inbound interface for each service model, generating a second test plan for an outbound interface of each service model, generating a third test plan for information consumed by the service models, generating a fourth test plan for a process model, wherein the process model utilizes the service models, and generating a fifth test plan that maps service models and the process model to executables of the system. The first, second, third, fourth, and fifth test plans are concatenated into a complete test plan for the SUT using the processor.

A computer program product for testing an SUT having a service-oriented architecture includes a computer readable storage medium having program code embodied therewith. The program code is executable by a computer to perform executable operations including generating, using a processor, a first test plan for an inbound interface for each service model, generating a second test plan for an outbound interface of each service model, generating a third test plan for information consumed by the service models, generating a fourth test plan for a process model, wherein the process model utilizes the service models, and generating a fifth test plan that maps service models and the process model to executables of the system. The executable operations also include concatenating the first, second, third, fourth, and fifth test plans into a complete test plan for the SUT using the processor.

DETAILED DESCRIPTION

Figure 1:
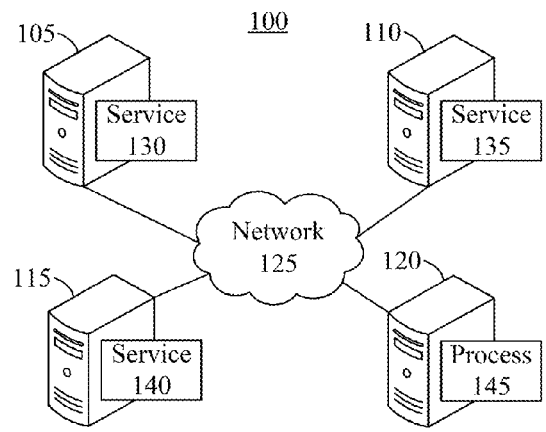
FIG. 1 is a block diagram illustrating an example of a system with a Service-Oriented Architecture (SOA).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium is a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments disclosed within this specification relate to testing a system having a Service-Oriented Architecture (SOA). In accordance with the inventive arrangements disclosed within this specification, testing tools are configured to leverage the existence of models, e.g., service models and process models, for an SOA-type system. Using the available models, test plans can be generated. Regression testing performed responsive to changes to the system can be scoped. Further, test cases can be generated. As a result, the testing that is performed for a system having an SOA can be precisely tailored according to the hierarchical nature of the system. Redundancy in testing is reduced as regression testing scope is intelligently determined as opposed to subjecting the system to an entire battery of regression testing that may not be required given the particular change that is implemented.

FIG. 1 is a block diagram illustrating an example of a system 100 with an SOA. System 100, being an SOA type of system, has one or more processes that link together a variety of different services. As shown, system 100 includes a plurality of servers, 105, 110, 115, and 120, each communicatively linked via a network 125. Network 125 can be implemented as, or include, any of a variety of different networks such as a WAN, a LAN, a wireless network, a mobile network, a Virtual Private Network (VPN), the Internet, or the like. Each of servers 105-120 executes suitable operational software, e.g., an operating system, and optionally a runtime environment for business processes and/or services. Servers 105, 110, and 115 each execute one or more services 130, 135, and 140, respectively. Server 120 executes one or more processes illustrated as process 145.

A "service" refers to a well-defined business functionality or task that is built as a software component in the form of a discrete piece or portion of program code and/or data structure. In general, a service performs a repeatable business task. A service can be reused for different purposes. A service is a loosely coupled unit of functionality as opposed to an executable or a dynamically linked library. A service uses a defined protocol that describes how the service is to pass data and parse messages. A process refers to a business process that is built or specified in the form of program code. A process refers to a collection of related, structured activities or tasks (e.g., services). A process is built by invoking at least one or more services in order to perform or effectuate the particular business process implemented by the process. A process can include, or reference, particular tasks that are to be performed by a human being.

Referring to FIG. 1, for example, process 145 performs a business process by invoking one or more or all of services 130-140 as may be required. With system 100 being an SOA type of system, each of services 130-140 and process 145 is associated with a particular requirement. Thus, a direct relationship exists between each service and a corresponding requirement and each process and a corresponding requirement.

In one aspect, each of services 130-140 and process 145 represents an executable that is implemented in accordance with a model. Each of services 130-140 implements a service model. Process 145 implements a process model. Models can be described by, or coded in, any of a variety of different modeling languages and/or protocols. For example, services are specified using Unified Modeling Language (UML), Service-Oriented Modeling Language (SoaML), or the like. Processes are specified, for example, using Business Process Model Notation (BPMN), Business Process Execution Language (BPEL), etc.

Figure 2:
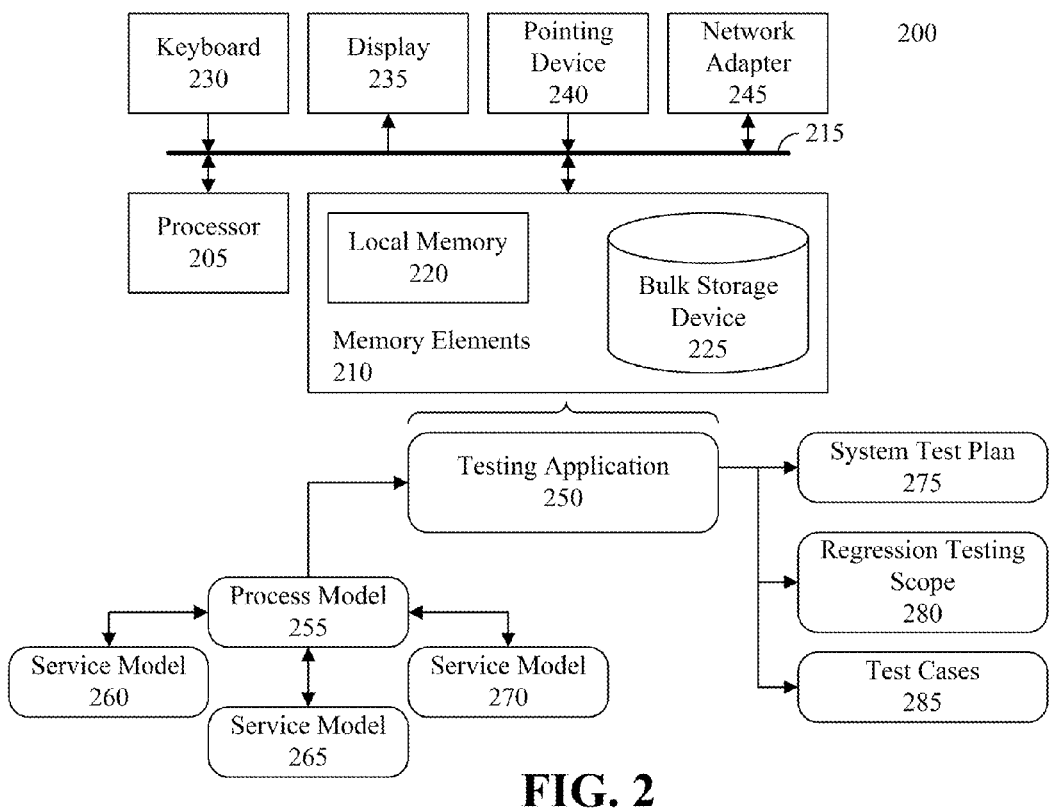
FIG. 2 is a block diagram illustrating an example of a testing system.

Because each model is specified in a known format, each model can be analyzed to determine various characteristics for testing purposes. FIG. 2 is a block diagram illustrating an example of a testing system 200. Testing system 200 includes at least one processor (e.g., a central processing unit) 205 coupled to memory elements 210 through a system bus 215 or other suitable circuitry. As such, testing system 200 stores program code within memory elements 210. Processor 205 executes the program code accessed from memory elements 210 via system bus 215. In one aspect, for example, testing system 200 is implemented as a computer or other programmable data processing apparatus that is suitable for storing and/or executing program code. It should be appreciated, however, that testing system 200 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. Testing system 200 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to testing system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, and Ethernet cards are examples of different types of network adapters 245 that can be used with testing system 200.

As pictured in FIG. 2, memory elements 210 store a testing application 250. Testing application 250, being implemented in the form of executable program code, can be executed by testing system 200 and, as such, can be considered an integral part of testing system 200. As illustrated in FIG. 2, testing system 200 operates upon one or more models, e.g., process model 255 and service models 260-270. Service models 260-270 are used or invoked by process model 255. As discussed, each model can be specified in a known process description language.

In analyzing the various models illustrated, testing system 200 generates or outputs a variety of results including a system test plan 275, a regression testing scope 280, and one or more test cases 285. As used herein, "outputting" and/or "output" can mean storing in memory elements 210, for example, writing to a file stored in memory elements 210, writing to display 235 or other peripheral output device, sending or transmitting to another system, exporting, or the like. Testing application 250, service models 260-270, process model 255, system test plan 275, regressing testing scope 280, and test cases 285 are functional data structures that impart functionality when employed, e.g., executed, by system 200.

Figures 3, 4:
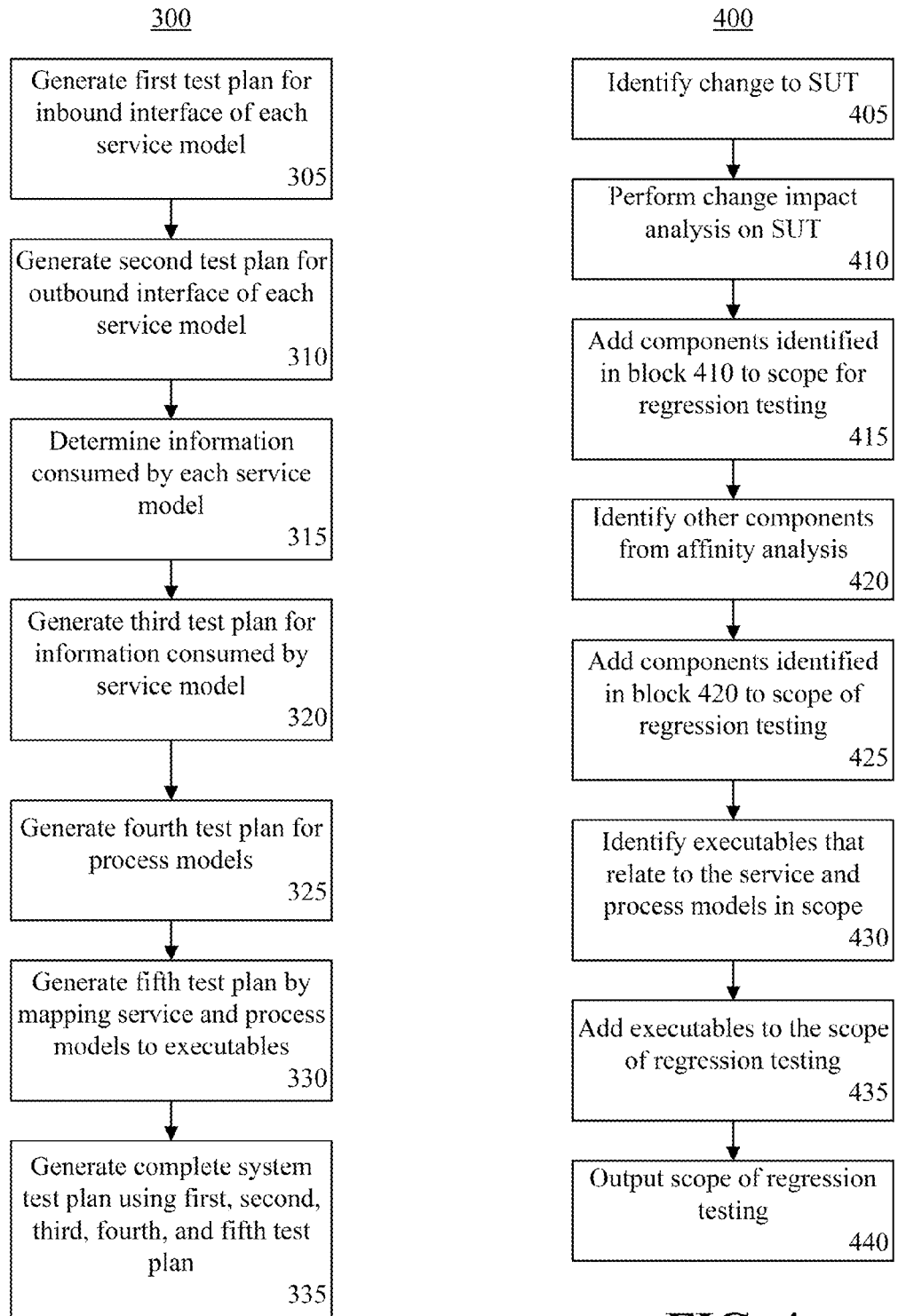
FIG. 3 is a flow chart illustrating an exemplary method of generating a test plan for a system having an SOA.
FIG. 4 is a flow chart illustrating an exemplary method of determining scope for regression testing for a system having an SOA.
Figure 5:
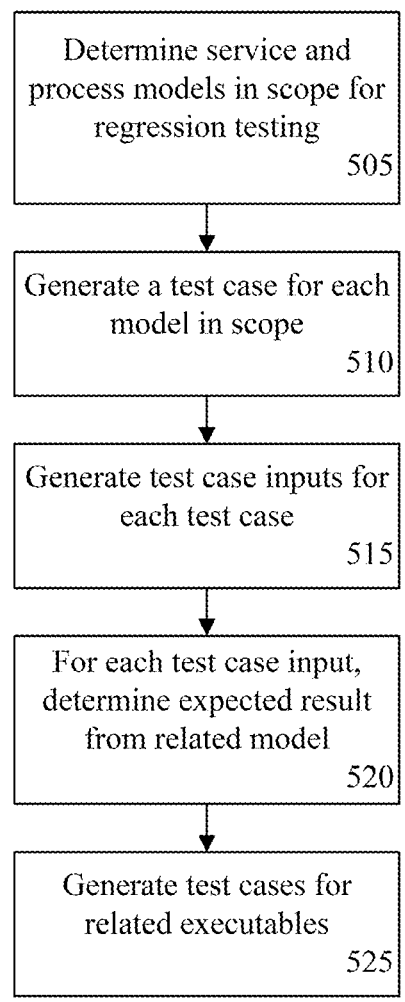
FIG. 5 is a flow chart illustrating an exemplary method of generating test cases for a system having an SOA.

The various techniques described herein with reference to FIGS. 3-5 begin with an underlying presumption that testing is performed using an "inside-out" approach. More particularly, the techniques described presume that the individual components, in reference to models and/or executables, have been tested successfully on an individual basis. As such, higher level testing can be performed which evaluates interaction among components.

FIG. 3 is a flow chart illustrating an exemplary method 300 of generating a test plan for a system having an SOA, referred to herein as a "system under test" or "SUT." System 100 is illustrative of an SUT. Method 300 is implemented by a testing system as described with reference to FIG. 2 and begins in a state where the testing system has access to the service and process models that define the SUT and that are available as input.

In block 305, the testing system generates a first test plan for the inbound interface of each service model. A test plan refers to a document that includes one or more test cases. Each test case generally includes the inputs to be applied, the particular services to which the inputs are to be applied, and the expected output from the service. As such, the test plan defines the scope, approach, resources, and schedule of intended testing activities.

The test plan, for example, defines test items, features (e.g., operations) to be tested, and the like. The inbound interface and outbound interface of a service model are well-defined. The inbound interface specifies how a calling entity interacts with the service defined by the service model. The inbound interface specifies, for example, available operations for the service and parameters of those operations. In block 305, the testing system evaluates the known aspects of the inbound interface of each service model and generates a test plan for the inbound interface of each model. As discussed, the first test plan specifies, for each inbound interface for each service model, a list of operations and parameters of the operations to be tested.

In block 310, the testing system generates a second test plan for each outbound interface of each service model. For each service model, the outbound interface is well-defined and specifies, for example, what that service calls or generates and where the output is provided. As such, expected output from the outbound interface is determined from the service model. Using the specified information of the outbound interface, the testing system generates a test plan for the outbound interface. The second test plan specifies, for each outbound interface of each service model, the type of output that is to be generated and where the output is to be provided.

In block 315, the testing system determines information that is consumed by each service model. U.S. Patent Publication 2010/0153906, entitled "Capturing Information Accessed, Updated and Created by Services and Using the Same for Validation of Consistency," which is assigned to International Business Machines Corporation of Armonk, N.Y., and fully incorporated herein by reference, illustrates various techniques for determining information consumed by each service model. In block 320, the testing system generates a third test plan. The third test plan lists the information that is utilized or accessed by each service model in accordance with the information determined in block 315, referred to as the information source(s). In addition, the testing system generates artifacts that test, or access, each information source. The third test plan can include the artifacts thereby including the necessary functionality for testing the information sources.

In block 325, the testing system generates a fourth test plan for process models. Each process model of the system includes one or more references to service models that are utilized or called by that process model. In block 325, for example, the testing system determines the outbound service invocations of processes are matches to the inbound interfaces on services. Determining the matches, as described, allows the flow of data from one service to another, e.g., input to output, to be determined for a process and the various services utilized by that process. The testing system generates the fourth test plan for the process models. The fourth test plan, as noted, correlates or matches a given outbound interface of a service model with an inbound interface of a service model for a given process model.

In block 330, the testing system generates a fifth test plan by mapping service and process models to actual executables within the system. Each service and process model is associated with an executable that implements the particular service model and/or process model. The fifth test plan specifies the mapping between models and executables.

In some cases, service models and process models are executable by an interpretation engine. As an illustrative example, particular models, e.g., BPMN models, are executable by an interpretation engine when specified with an adequate amount of detail. Execution engines are known in the art and execute models of the variety described within this specification. In this regard, a model, whether for a service or a process, is directly executable by an interpretation engine in order to implement the given service or process represented by that model. Referring to block 330, the mapping is implemented so that each model is mapped to itself, e.g., the same model as an executable or a different model that is specified with sufficient detail so as to be executable by an interpretation engine.

In other cases, actual executables are generated that implement the functionality described by a model. As such, the service or process, as the case may be, is implemented by the executable. In that case, each model is associated with the executable that is executed by a data processing apparatus without using an execution engine in order to implement the relevant service and/or function.

In block 335, the testing system generates a complete test plan for the SUT using the first, second, third, fourth, and fifth test plans. In one aspect, the testing system generates the test plan for the SUT by concatenating the first, second, third, fourth, and fifth test plans.

FIG. 4 is a flow chart illustrating an exemplary method 400 of determining a scope for regression testing of an SUT. Method 400, as performed by the testing system, effectively determines how extensive the regression testing to which the SUT is subjected should be given an enumerated change to the SUT. In general, the SUT should be tested sufficiently to ensure reliable operation, but need not be subjected to each regression test that is available when not necessary simply because the test is available.

In block 405, the testing system identifies a change to the SUT. For example, a developer can specify or implement a particular change to a service or service model. In block 410, the testing system performs a change impact analysis on the SUT. The testing system utilizes the service and process models to identify dependencies between the changed service and any other components (i.e., service models and/or process models) of the SUT. The testing system traces the dependencies to determine each dependent component that must change or adapt given the change specified in block 405. In one aspect, the testing system utilizes equivalency testing to determine the point, e.g., component, along the dependency path being traced that is sufficiently stable for the testing system to stop tracing the dependencies of the components, e.g., not continue to a next level of dependency for evaluating change impact. Equivalency testing refers to proving that two representations of a system, e.g., one or more portions of the SUT (e.g., services) before and after the change, exhibit the same behavior. The testing system determines that no further regression testing is needed once testing equivalence for a component and the specification is reached.

In one example, testing equivalence is achieved for a component along the path (e.g., a service) when a set of test cases covering all interfaces/operations and with all "significant data sets" as inputs have been executed and found to yield a same result as obtained for the previous version of the component. Once equivalency is achieved, e.g., same test results are obtained for the current component version as a prior component version (or prior version of the SUT including the component or prior component version), one need not continue "inside out" regression testing and need not continue to a further node or component in the dependency path.

Examples of changes that require analysis of dependent components include, for example, adding an operation to a service, deleting an operation from a service, adding a parameter to an operation of a service, deleting a parameter from an operation of a service, etc. In one example, the service contract as part of the service model is evaluated by the testing system to determine whether any other non-functional characteristics of the service are interacting with a changed part of an interface of a service (e.g., a changed inbound and/or outbound interface for the service). When, for example, other non-functional characteristics are not interacting with the changed part of an interface, then the testing system determines that testing equivalency has occurred and no further dependencies need be evaluated.

A "service contract" refers to a programmatic service contract. A programmatic service contract can include, but is not limited to, the following exemplary segments or parts: a header, name of the service, version, owner, responsible party, service type (e.g., presentation, process, business, data, integration, functional, etc.), functional requirement, service operations, invocation (e.g., how to invoke, the universal resource locator, SOAP, REST, Events triggers), security constraints (e.g., who can execute), quality of service, or the like.

Non-functional characteristics of a SUT refer to aspects of the software that may not be related to a specific function or user action such as scalability or security. Non-functional testing does not mean that the components being tested are not functional. For example, non-functional testing refers to characteristics such as the number of people that can log into the SUT at one time. Other exemplary areas included in non-functional testing include functionality testing, reliability testing, usability testing, efficiency testing, maintainability testing, portability testing, baseline testing, compliance testing, documentation testing, endurance testing, load testing, performance testing, stress testing, scalability testing, security testing, etc.

In block 415, the testing system adds each component identified by the impact analysis to the scope for regression testing. The scope for regression testing refers to a list of models and/or corresponding executables that are to be tested. Each component that is determined up to the point at which the stability of the interface of the component is determined to be sufficient, e.g., via equivalency testing, is added to the scope.

In block 420, the testing system evaluates components that are identified in block 410 using affinity analysis. Any components having a level of affinity with the changed component that exceeds a threshold, for example, can be identified by the testing system. For example, components can be evaluated in terms of one or more affinity characteristics. Components that (1) call each other; (2) are called by the same other component or that call the same other component themselves; and/or (3) have overlapping parameters, e.g. overlap between parameter(s) and/or data type(s), can be said to have affinity. In one aspect, affinity characteristics can be given equal weight or importance. In another aspect, affinity characteristics are weighted differently, e.g., according to the order listed above with (1) being the most important and (3) being the least.

The "level" of affinity can be calculated according to the particular affinity characteristics that components are found to have. Such is the case, for instance, in an implementation in which the affinity characteristics are prioritized or weighted. In another example, the affinity characteristics further can be evaluated in terms of a percentage of the characteristics (e.g., percentage of data types or parameters) that must have affinity. Level of affinity between components can be calculated using any of the techniques described and various combinations of the techniques described. A particular "level" of affinity can be set within the system for purposes of evaluation and comparison, e.g., as to whether a component has the minimum level of affinity with a changed component. Accordingly, the level of affinity specified determines, at least in part, the scope of regression testing. In any case, in block 425, the identified components can be added to the scope of the regression testing.

In block 430, the testing system determines the executable that corresponds to, or implements, each model that has been added to the scope of the regression testing. In block 435, the testing system adds each executable identified in block 430 to the scope of the regression testing. In block 440, the testing system outputs the scope of the regression testing that is to be performed.

FIG. 5 is a flow chart illustrating an exemplary method 500 of generating test cases for an SUT. Method 500 can be performed by the testing system described within this specification with reference to FIGS. 2-4.

In block 505, the testing system determines the models in scope for regression testing. In block 510, the testing system generates a test case for each model in scope. Typically, the testing system generates more than one test case, e.g., a plurality of test cases, for each model that is in scope.

In one illustrative example, the testing system generates at least one test case per interface or operation on a service model, one test case per activity in a process model, and one test case for the process as a whole. In this regard, the phrase "significant test data," as used within this specification, refers to sets of test data that are sufficient for providing complete behavioral coverage without having two such data sets that are considered "testing equivalent." Significant test data, in effect, means that the test data has sufficient test data sets so that testing equivalence of the same set of test cases/data sets "pass testing" for two versions of the same operation/interface.

In block 515, the testing system generates test case inputs for each test case. In block 520, for each test case input, the testing system determines the expected result from the related model. The expected result is determined by the testing system using various elements specified by or within the model, e.g., output parameters, and service contracts for the model that may be available for inspection. In block 525, the testing system generates test cases for the related executables. As such, each test case generally includes the inputs to be applied, the particular services to which the inputs are to be applied, and the expected output from the service.

FIGS. 3-5 illustrate various aspects relating to generating test plans, generating test cases, and determining scope of regression testing. It should be appreciated that the techniques illustrated in each of FIGS. 3-5 can be performed independently of the others or in various combinations. For example, test cases as described in FIG. 5 can be generated. Test plans can be generated as described with reference to FIG. 3 using test cases generated in accordance with FIG. 5. Scope of regression testing can be performed as needed responsive to various changes to the SUT.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of testing a system under test (SUT) having a service-oriented architecture, the method comprising:
    generating a first test plan for an inbound interface for each of a plurality of service models, each of the plurality of service models implemented by a respective service executed in the SUT;
    generating a second test plan for an outbound interface of each of the plurality of service models;
    generating a third test plan for information consumed by each of the plurality of service models using a processor;
    generating a fourth test plan for a process model, wherein the process model utilizes each of the plurality of service models;
    generating a fifth test plan that maps each of the plurality of service models and the process model to executables of the SUT; and
    concatenating the first, second, third, fourth, and fifth test plans into a complete test plan for the SUT using the processor.

2. The method of claim 1, further comprising:
    for a change to the SUT, determining a scope of regression testing needed for testing the change to the SUT, wherein the scope of the regression testing specifies each model, selected from a group consisting of the plurality of service models and the process model, that is to be tested by the regression testing.

3. The method of claim 2, wherein determining a scope of regression testing comprises:
    determining each model, selected from the group consisting of the plurality of service models and the process model, that is dependent upon the change to the SUT; and
    adding each dependent model to the scope of the regression testing.

4. The method of claim 3, further comprising:
    determining each of a plurality of executables corresponding to the dependent models added to the scope of the regression testing.

5. The method of claim 4, further comprising:
    adding each of the plurality of determined executables to the scope of the regression testing.

6. The method of claim 2, further comprising:
    generating a test case for the each model specified by the scope of the regression testing;
    determining a test case input for each generated test case; and
    determining an expected test result for each test case input.

7. The method of claim 6, further comprising:
    generating test cases for executables associated with the each model specified by the scope of the regression testing.

8. A system for testing a system under test (SUT) having a service-oriented architecture, the system comprising:
    a processor configured to initiate executable operations comprising:
        generating a first test plan for an inbound interface for each of the plurality of service models;
        generating a second test plan for an outbound interface of each service model;
        generating a third test plan for information consumed by each of the plurality of service models;
        generating a fourth test plan for a process model, wherein the process model utilizes each of the plurality of service models;
        generating a fifth test plan that maps each of the plurality of service models and the process model to executables of the SUT; and
        concatenating the first, second, third, fourth, and fifth test plans into a complete test plan for the SUT using the processor.

9. The system of claim 8, further comprising:
    for a change to the SUT, determining a scope of regression testing needed for testing the change to the SUT, wherein the scope of the regression testing specifies each model, selected from a group consisting of the plurality of service models and the process model, that is to be tested by the regression testing.

10. The system of claim 9, wherein determining a scope of regression testing comprises:
    determining each model selected from the group consisting of the plurality of service models and the process model, that is dependent upon the change to the SUT; and
    adding each dependent model to the scope of the regression testing.

11. The system of claim 10, wherein the processor is further configured to initiate an executable operation comprising:
    determining each of a plurality of executables corresponding to the dependent models added to the scope of the regression testing.

12. The system of claim 11, wherein the processor is further configured to initiate an executable operation comprising:
    adding each of the plurality of determined executable to the scope of the regression testing.

13. The system of claim 9, wherein the processor is further configured to initiate executable operations comprising:
    generating a test case for the each model specified by the scope of the regression testing;
    determining a test case input for each generated test case; and
    determining an expected test result for each test case input.

14. The system of claim 13, wherein the processor is further configured to initiate an executable operation comprising:
    generating test cases for executables associated with the each model specified by the scope of the regression testing.

15. A computer program product for testing a system under test (SUT) having a service-oriented architecture, the computer program product comprising:
    a computer readable storage medium having program code embodied therewith, the program code executable by a computer to perform executable operations comprising:
        generating, using a processor, a first test plan for an inbound interface for each of a plurality of service models, each of the plurality of service models implemented by a respective service executed in the SUT;
        generating a second test plan for an outbound interface of each of the plurality of service models;
        generating a third test plan for information consumed by each of the plurality of service models using a processor;

generating a fourth test plan for a process model, wherein the process model utilizes each of the plurality of service models;

generating a fifth test plan that maps each of the plurality of service models and the process model to executables of the SUT; and concatenating the first, second, third, fourth, and fifth test plans into a complete test plan for the SUT using the processor.

16. The computer program product of claim 15, wherein the computer readable storage medium has further program code embodied therewith, the further program code executable by a computer to perform executable operations comprising:

for a change to the SUT, determining a scope of regression testing needed for testing the change to the SUT, wherein the scope of the regression testing specifies each model, selected from a group consisting of the plurality of service models and the process model, that is to be tested by the regression testing.

17. The computer program product of claim 16, wherein determining a scope of regression testing comprises:

determining each model, selected from the group consisting of the plurality of service models and the process model, that is dependent upon the change to the SUT; and adding each dependent model to the scope of the regression testing.

18. The computer program product of claim 17, wherein the computer readable storage medium has further program code embodied therewith, the further program code executable by a computer to perform executable operations comprising:

determining each of a plurality of executables corresponding to the dependent models added to the scope of the regression testing; and adding each of the plurality of determined executables to the scope of the regression testing.

19. The computer program product of claim 16, wherein the computer readable storage medium has further program code embodied therewith, the further program code executable by a computer to perform executable operations comprising:

generating a test case for the each model specified by the scope of the regression testing;

determining a test case input for each generated test case; and determining an expected test result for each test case input.

20. The computer program product of claim 19, wherein the computer readable storage medium has further program code embodied therewith, the further program code executable by a computer to perform executable operations comprising:

generating test cases for executables associated with the each model specified by the scope of the regression testing.

* * * * *